(12) United States Patent
Bäcker et al.

(10) Patent No.: US 12,081,082 B2
(45) Date of Patent: Sep. 3, 2024

(54) LAMINATED CORE AND METHOD FOR PRODUCING A LAMINATED CORE

(71) Applicant: Vacuumschmelze GmbH & Co. KG, Hanau (DE)

(72) Inventors: Frederic Bäcker, Darmstadt (DE); Jens Diehl, Langenselbold (DE)

(73) Assignee: VACUUMSCHMELZE GMBH & CO. KG, Hanau (DE)

( * ) Notice: Subject to any disclaimer, the term of this patent is extended or adjusted under 35 U.S.C. 154(b) by 109 days.

(21) Appl. No.: 17/165,894

(22) Filed: Feb. 2, 2021

(65) Prior Publication Data

US 2021/0328484 A1 Oct. 21, 2021

(30) Foreign Application Priority Data

Feb. 3, 2020 (DE) ...................... 10 2020 102 638.2

(51) Int. Cl.
*H02K 15/02* (2006.01)
*B23K 26/0622* (2014.01)
(Continued)

(52) U.S. Cl.
CPC ....... *H02K 15/024* (2013.01); *B23K 26/0622* (2015.10); *B23K 26/082* (2015.10);
(Continued)

(58) Field of Classification Search
CPC .......... H02K 15/024; H02K 1/02; H02K 1/16; H02K 1/04; H02K 15/022; B23K 26/0622; B23K 26/082; B23K 26/21; B23K 26/38; B23K 2101/16; B23K 2103/02; B23K 26/0093; B23K 26/0846; B23K 26/244; B32B 15/01; B32B 37/06; B32B 38/0004;
(Continued)

(56) References Cited

U.S. PATENT DOCUMENTS 4,912,297 A * 3/1990 Beyer ................ B23K 26/0846
219/121.74
8,887,377 B2 * 11/2014 Hasegawa ................ H02K 1/16
310/216.004

(Continued)

FOREIGN PATENT DOCUMENTS

DE 102008047761 A1 4/2010
DE 102009049750 A1 4/2011
(Continued)

*Primary Examiner* — Alex W Mok
(74) *Attorney, Agent, or Firm* — Dickinson Wright PLLC

(57) ABSTRACT

A method for producing a laminated core is provided in which a plurality of lamination sheets is partially or completely separated from a strip made of a soft magnetic alloy by laser sublimation cutting, the lamination sheets each having a main surface and a thickness d. The main surface of a first of the lamination sheets is stacked on the main surface of a second of the lamination sheets in a direction of stacking and the main surfaces of the first and the second lamination sheets are substance-to-substance joined at a plurality of points by laser welding, a plurality of filler-free joints being formed between the between the first and the second lamination sheets and being entirely surrounded by the main surfaces of the first and the second lamination sheets.

20 Claims, 4 Drawing Sheets

(51) Int. Cl.
  *B23K 26/082* (2014.01)
  *B23K 26/21* (2014.01)
  *B23K 26/38* (2014.01)
  *B32B 15/01* (2006.01)
  *B32B 37/06* (2006.01)
  *B32B 38/00* (2006.01)
  *C22C 30/00* (2006.01)
  *C22C 38/02* (2006.01)
  *C22C 38/06* (2006.01)
  *H01F 1/147* (2006.01)
  *H02K 1/02* (2006.01)
  *H02K 1/16* (2006.01)

(52) U.S. Cl.
  CPC ............ *B23K 26/21* (2015.10); *B23K 26/38* (2013.01); *B32B 15/01* (2013.01); *B32B 37/06* (2013.01); *B32B 38/0004* (2013.01); *C22C 30/00* (2013.01); *C22C 38/02* (2013.01); *C22C 38/06* (2013.01); *H01F 1/147* (2013.01); *H02K 1/02* (2013.01); *H02K 1/16* (2013.01); *B32B 2307/208* (2013.01); *B32B 2310/0843* (2013.01); *C22C 2202/02* (2013.01); *Y10T 29/49009* (2015.01)

(58) Field of Classification Search
  CPC ...... B32B 2307/208; B32B 2310/0843; C22C 30/00; C22C 38/02; C22C 38/06; C22C 2202/02; H01F 1/147; H01F 41/0233; H01F 1/16; H01F 3/02; Y10T 29/49009
  USPC .................................................. 310/216.006
  See application file for complete search history.

(56) References Cited

U.S. PATENT DOCUMENTS

| | | | |
|---|---|---|---|
| 8,943,677 B2 * | 2/2015 | Gerster | C22C 38/12 336/200 |
| 2002/0000261 A1 * | 1/2002 | Fujikura | C21D 8/1288 148/108 |
| 2006/0267447 A1 * | 11/2006 | Buttner | H02K 1/30 310/261.1 |
| 2007/0096587 A1 * | 5/2007 | Ionel | H02K 1/148 310/180 |
| 2008/0042505 A1 | 2/2008 | Gerster et al. | |
| 2009/0032503 A1 * | 2/2009 | Danzer | B23K 26/38 219/121.44 |
| 2009/0220815 A1 * | 9/2009 | Canourgues | C21D 9/50 428/653 |
| 2012/0156441 A1 | 6/2012 | Gerster et al. | |
| 2013/0068738 A1 * | 3/2013 | Schurmann | B23K 26/03 219/121.72 |
| 2013/0154434 A1 * | 6/2013 | Hasegawa | H02K 1/16 310/216.004 |
| 2013/0229084 A1 * | 9/2013 | Allen | H02K 1/16 310/216.008 |
| 2016/0265078 A1 * | 9/2016 | Kajihara | C22C 38/12 |
| 2017/0260600 A1 * | 9/2017 | Okubo | C22C 38/005 |
| 2020/0067388 A1 | 2/2020 | Zeadan et al. | |
| 2021/0328484 A1 * | 10/2021 | Bäcker | H02K 1/02 |

FOREIGN PATENT DOCUMENTS

| | | |
|---|---|---|
| DE | 102017009132 A1 | 3/2018 |
| DE | 102016222385 A1 | 5/2018 |
| DE | 102018006773 A1 | 3/2019 |
| DE | 102017130883 A1 | 6/2019 |
| EP | 1614499 A1 | 1/2006 |
| EP | 2629922 B1 | 3/2015 |

* cited by examiner

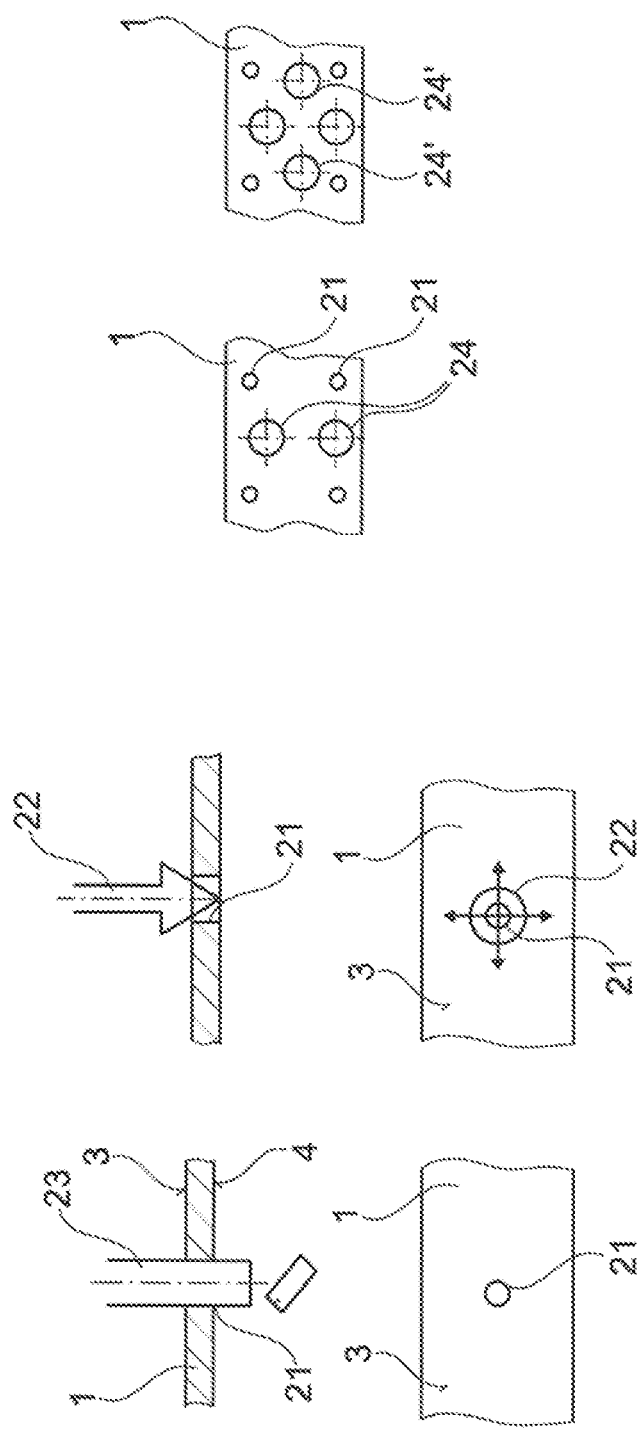

LAMINATED CORE AND METHOD FOR PRODUCING A LAMINATED CORE

This U.S. patent application claims priority to German patent application 10 2020 102 638.2, filed on Feb. 3, 2020, the entire contents of which are incorporated herein by reference for all purposes.

BACKGROUND

1. Technical Field

The invention relates to a laminated core and a method for producing a laminated core.

2. Related Art

In electromagnetic machines that can be operated as electric motors or generators power density and efficiency are substantially determined by the stator and rotor components of the motor. They conduct and concentrate the magnetic flux generated by the windings and permanent magnets and enable it to be converted into mechanical work.

When a motor is running the direction and strength of the magnetic flux in the rotor and the stator are subject to periodic change. This alternating magnetic field induces eddy current in the vertical direction, i.e. in the direction of the longitudinal axis of the rotor and the stator, that dissipate part of the energy supplied to the system as heat such that it ceases to contribute to the mechanical work done. In order to minimise eddy currents and the associated losses it is desirable for the electrical resistance of the rotor and the stator perpendicular to the magnetic flux to be higher. This is typically achieved by a layered structure in which the rotor and the stator have a plurality of identical individual sheets referred to as "laminations" or "layers" that are stacked one on top of another and electrically insulated from one another. A structure of this type is referred to as a "laminated core". In such an arrangement eddy current losses are proportional to the square of the sheet thickness of the individual layers such that the thinner the layers, the lower the eddy current losses and the higher the efficiency.

A further characteristic of laminated cores is the fill factor. This term describes the amount of magnetically conductive material within a laminated core and is obtained by subtracting the volume of insulating layers, adhesive layers, air gaps and other non-magnetically conductive layers from the total volume. Amongst other factors, fill factor determines the power density that can be achieved with a given drive.

Stator and rotor laminated cores can be produced using various manufacturing methods based on various lamination joining and shaping processes. Some of these can be integrated cost-effectively in mass production processes such as punching; others are more suitable for sample and batch production. There are, however, also undesirable restrictions relating either to the sheet thickness or material that can be processed or the quality that can be achieved in terms of fill factor, geometric tolerances and the avoidance of damage to the soft magnetic material due to the production method.

SUMMARY

An object is therefore to provide a laminated core that is effective in terms of both performance and cost and to provide a method for producing a laminated core that is flexible.

According to the invention, a laminated core is provided that comprises a plurality of lamination sheets that are made of a soft magnetic alloy and have a main surface and a thickness d. The main surfaces of the lamination sheets are stacked one on top of another in a direction of stacking and adjacent lamination sheets are joined to one another by a plurality of substance-to-substance joints. These joints are filler-free and entirely surrounded by the main surfaces of the adjacent lamination sheets. The lamination sheets have edges that are free from burrs.

At least one of the edges of a lamination sheet is free from burrs. This can be achieved by separating the lamination sheets from a strip of the soft magnetic alloy by laser sublimation cutting. Since in laser sublimation cutting the material is sublimated or evaporated at the cutting line in order to sever the material, no melt droplets are formed and the edge has no rough cut edge and is therefore free from burrs.

The joints are laterally entirely surrounded by the main surfaces of the lamination sheets in which they are arranged and are thus arranged not at the edges of the lamination sheets but within the main surfaces of the lamination sheets and are separated from the edges by the material of the lamination sheets. These joints may, for example, be formed of resolidified molten material of the lamination sheets and be formed by a process such as welding, e.g. spot welding or laser spot welding.

The invention is based on the use of laser sublimation cutting to separate the lamination sheets from the strip, followed by laser spot welding using a lapping technique as the stacking process.

The laser cutting is carried out using a sublimation process in which the material of the strip to be cut is evaporated locally by a high-energy laser pulse to a depth of 30-50 μm, for example. Applying a plurality of such pulses one after another results in linear material removal. By repeating this removal process at the same point the cut is deepened until the material is severed.

Cuts produced in a sublimation process are largely free from burrs. As a result, any inadvertent contact between layers due to protruding or bent-over burrs and the time-consuming removal of these burrs can thus either be avoided or does not take place at all. There are also no notable heat affected zones.

Laser welding using an overlapping technique lends itself to the stacking of very thin layers with a sheet thickness of less than 0.1 mm as well as offering very good potential for automation and so good productivity levels. It also improves the resistance to eddy currents product characteristic of the stacks.

The stack type produced using surface laser welding is distinguished not by a few comparatively large joints but rather by a plurality of smaller, spatially favourably distributed joints that can be optimised in number, size, form and position to have a minimal adverse effect on the electromagnetic properties and the desired joint strength of the individual layers.

The combination of laser sublimation cutting to contour shape the laminations and laser welding to form a plurality of separate discrete joints in the main surface of the lamination sheets has the following advantages. The comparatively high handling intensity and cost of (repair) annealing individual laminations or stacks can be replaced by the highly simplified and clearly more favourable annealing of the starting material (coil) prior to stacking. This is made possible by the fact that, unlike mechanical cutting, laser sublimation cutting has no requirements in terms of the hardness or punchability of the material to be cut. In addition, sublimation cutting creates no notable heat affected zones or plastic deformation whose damaging effect on the soft magnetic properties would otherwise have to be repaired by annealing. The laser welding joining method means that thin sheets can be reliably joined at a number of points and that no straightening is required to remove coil set. It also obviates adverse effects on the soft magnetic properties due to plastic deformation during this step.

The combination of contour shaping and stacking can be carried out on a machine, thereby rendering superfluous the time-consuming handling of individual laminations between individual process steps.

Since both manufacturing steps involve mirror-controlled laser processes, the only moving system parts required are those for workpiece positioning and transport. There is no need for shaping wear parts.

The present invention provides a laminated core and a method for producing a laminated core that are particularly suitable for the production of a medium-sized and large series of laminated cores for high-performance and high-efficiency stators and rotors and for the production of laminated cores from very thin layers of sheet metal. Laser sublimation cutting is used to separate the lamination sheets from the strip and a joining method such as laser spot welding using a lapping technique, for example, is used to create a plurality of small joints to produce the laminated core. The core type meets the requirements for efficient high-performance drives, while the manufacturing method permits the structure on which it is based and offers a high degree of potential for automation and thus high productivity levels.

In one embodiment the joining of individual sheet layers by laser spot welding using an overlap welding technique is used to produce laminated cores for stators and rotors. Two or more sheet layers to be joined together are stacked one on top of another and tensioned clamped together (pressed against one another) in order to achieve a surface-to-surface contact with the minimum possible air gap. The sheet material is fused by laser beam from the exposed main surface of the top-most lamination sheet in the stack to a defined depth and thus over a defined number of layers. The solidification of the molten material produces a substance-to-substance joint between the layers. The depth of the joint produced and so the number of layers it joins can be varied by adjusting the laser beam parameters (power, focal position, pulse duration, etc.). The joint can be positioned anywhere on the main surface of the laminations. These steps are repeated, stacking further lamination sheets on the stack and then joining the stack to the stacks below it by a plurality of joints in order to produce the desired height.

The laminated core has good properties for the manufacture of rotors and stators in medium-sized and mass production series. It offers a better compromise between production process productivity, the stack properties achieved in terms of expected eddy current losses and joint strength between individual layers. This manufacturing method and the core type it produces result in the following advantages:

In particular, the laminated core can have very thin laminations of less than 0.2 mm, e.g. 0.1 mm or less, resulting in lower eddy current losses and higher output.

The manufacturing method is suitable for stacking very thin layers with a sheet thickness of less than 0.2 mm, e.g. with a sheet thickness of 0.1 mm or less, with very good potential for automation and so good productivity levels. This improves the resistance to eddy currents product characteristic of the laminated core in comparison to laminated cores manufactured using production processes with similar or better productivity, such as in-die stacking, bonding or the welding of an entire stack with an edge seam, that can only be used with thicker sheet layers. Conversely, the levels of productivity achieved for comparably thin or thinner layers using conventional stacking techniques are not comparable with those of the method disclosed here. The method according to the invention therefore permits the mass production of stacks that meet the highest requirements.

In some embodiments the joints are laterally completely bordered or defined by the crystalline material of the lamination sheets, while the joints themselves have a structure that is different to the rest of the lamination sheet. For example, the joints may have a smaller grain size than or a different texture to the crystalline material of the adjacent lamination sheet. This excludes the lateral adjacence of part of the joint, in particular the side wall, to the air, as is the case with a joint on the end face of the laminated core that extends over the thickness of the lamination sheet, for example.

In some embodiments the joints are formed of molten material of the soft magnetic alloy. The molten material may have the same overall composition as the soft magnetic alloy of the surrounding lamination sheets but different phases, or may have the same composition and the same phases, as the case may be.

In some embodiments the joints of the laminated core are formed by weld seams. The weld seams may have different lateral forms, e.g. they may be punctiform or elongated.

In some embodiments the joints are distributed over the main surface of the lamination sheets and may be distributed over the central region of the main surface of the lamination sheets. The joints may be evenly distributed over the main surface or the central region of the main surface in order to increase mechanical stability, for example, or may be unevenly distributed over the main surface or the central region of the main surface in order to improve the magnetic properties of the laminated core in operation, for example.

In some embodiments the joints are distributed throughout the volume of the laminated core. The joints may be arranged in a plurality of planes of the laminated core. The joints may have a different lateral arrangement in the planes such that joints in adjacent planes are laterally offset, or may be arranged one on top of another in the direction of stacking in order to form a column.

The joints may have different lateral forms. The joints of a laminated core may have the same or different lateral forms. For example, the joints in the plane of the main surface of the lamination sheets may be punctiform, circular, elongated, corner-shaped, annular, curved or straight or be X-shaped, Y-shaped, V-shaped or U-shaped. The joints may have different forms within a plane and/or in different planes.

In some embodiments at least one of the joints has at least one dimension A, where $10~\mu m \leq A \leq 1000~\mu m$, preferably $10~\mu m \leq A \leq 500~\mu m$, preferably $20~\mu m \leq A \leq 100~\mu m$.

In some embodiments at least one of the joints is punctiform and has a diameter D, where $D=A$.

In some embodiments at least one of the joints is elongated and has a width B and a length L, where $B=A$ and $L>B$.

The lamination sheets may be of different thicknesses d, where $d \leq 0.5$ mm, preferably $d \leq 0.35$ mm, $d \leq 0.20$ mm or $d \leq 0.10$ mm. The minimum thickness of the lamination may be determined by manageability. For example, the minimum thickness may be 0.02 mm.

The joints have a depth t and the depth t of at least one of the joints may extend over a maximum of two or a maximum of three or at least two or at least three adjacent stacked lamination sheets in order to join the two or at least three adjacent stacked lamination sheets to one another substance-to-substance. In one embodiment t<2d such that the joint is arranged in two adjacent lamination sheets but not over the entire thickness of at least one of these lamination sheets. As a result, the lower main surface of the lower lamination sheet has no joint.

The depth of the individual joints may be restricted by arranging the joint in only two or only three adjacent stacked lamination sheets. The depth of the joint may, for example, be restricted by the choice of the power and pulsation duration of the laser beam. The joints in a laminated core may have different depths.

In one embodiment t>2d such that the joint is also arranged in the main surface of the bottom-most lamination sheet and is arranged in three adjacent lamination sheets.

In some embodiments the joint extends in the bottom-most lamination sheet of the laminated core over only part of the total thickness of the sheet such that the lower end face of the laminated core is free from joints. The joints can therefore have a molten region in the bottom-most lamination sheet of the laminated core that runs over only part of the total thickness of the lamination sheet such that the lower end face of the laminated core is free from joints.

In some embodiments the joints together form a total electrical contact surface between two adjacent joined lamination sheets of less than 10%, preferably less than 5% or less than 1%, of the boundary surface between the lamination sheets to ensure that the individual lamination sheets are sufficiently electrically insulated from one another. The individual lamination sheets may be coated with an insulating layer. This insulating layer may be applied before the joints are produced if the layer is thin because a joint can be formed through the insulating layer.

The lamination sheets may be separated from a strip. The lamination sheets may have a direction that is parallel to a given direction of the strip. This given direction of the strip may, for example, be the direction of rolling of the strip, the longitudinal direction of the strip conventionally being lengthwise to the direction of rolling of the strip. The lamination sheets are stacked one on top of another in the direction of stacking such that the direction of the lamination sheets varies. In some embodiments the directions of the lamination sheets are arranged randomly. In some embodiments adjacent lamination sheets are rotated in relation to one another by a given angle, e.g. 90°, 45° or 30°. These arrangements of the lamination sheets can be used to compensate for direction-dependent lamination sheet or strip parameters. For example, magnetic properties might be different in the direction of rolling and the transverse direction.

In some embodiments the lamination sheets have a thickness that varies over the area of the lamination sheet and/or the lamination sheets themselves are of different thicknesses. For example, the thickness of a lamination sheet may be greater in the central region than in the edge region. The thickness of the lamination sheet of a laminated core may also be different if the thickness of the strip from which it has been separated varies over the length or the width of the strip or if the lamination sheets have been separated from strips of different thickness. By choosing a suitable stacking method in which the lamination sheets are arranged in different directions about the direction of stacking it is possible to compensate for direction-dependent variations in the thickness of the lamination sheets.

Various soft magnetic alloys can be used for the lamination sheets. For example, the soft magnetic alloy may have one of the following compositions:

an FeSi-based alloy with 2 to 4.5 wt % of at least one element from the group comprising Si and Al, the rest Fe and unavoidable impurities, or a CoFe-based alloy comprising 35 to 55 wt % Co and up to 2.5 wt % V, the rest Fe and unavoidable impurities, or a CoFe-based alloy comprising 45 wt %≤Co≤52 wt %, 45 wt %≤Fe≤52 wt %, 0.5 wt %≤V≤2.5 wt %, the rest Fe and unavoidable impurities, or a CoFe-based alloy comprising 35 wt %≤Co≤55 wt %, preferably 45 wt %≤Co≤52 wt %, 0 wt %≤Ni≤0.5 wt %, 0.5 wt %≤V≤2.5 wt %, the rest Fe and unavoidable impurities, or a CoFe-based alloy comprising 35 wt %≤Co≤55 wt %, 0 wt %≤V≤2.5 wt %, 0 wt %≤(Ta+2Nb)≤1 wt %, 0 wt %≤Zr≤1.5 wt %, 0 wt %≤Ni≤5 wt %, 0 wt %≤C≤0.5 wt %, 0 wt %≤Cr≤1 wt %, 0 wt %≤Mn≤1 wt %, 0 wt %≤Si≤1 wt %, 0 wt %≤Al≤1 wt %, 0 wt %≤B≤0.01 wt %, the rest Fe and unavoidable impurities, or a CoFe-based alloy comprising 5 to 25 wt % Co, 0.3 to 5.0 wt % V, the rest Fe and unavoidable impurities, or a CoFe-based alloy comprising substantially:

| |
|---|
| 5 wt % ≤ Co ≤ 25 wt % |
| 0.3 wt % ≤ V ≤ 5.0 wt % |
| 0 wt % ≤ Cr ≤ 3.0 wt % |
| 0 wt % ≤ Si ≤ 3.0 wt % |
| 0 wt % ≤ Mn ≤ 3.0 wt % |
| 0 wt % ≤ Al ≤ 3.0 wt % |
| 0 wt % ≤ Ta ≤ 0.5 wt % |
| 0 wt % ≤ Ni ≤ 0.5 wt % |
| 0 wt % ≤ Mo ≤ 0.5 wt % |
| 0 wt % ≤ Cu ≤ 0.2 wt % |
| 0 wt % ≤ Nb ≤ 0.25 wt % |
| 0 wt % ≤ Ti ≤ 0.05 wt % |
| 0 wt % ≤ Ce ≤ 0.05 wt % |
| 0 wt % ≤ Ca ≤ 0.05 wt % |
| 0 wt % ≤ Mg ≤ 0.05 wt % |
| 0 wt % ≤ C ≤ 0.02 wt % |
| 0 wt % ≤ Zr ≤ 0.1 wt % |
| 0 wt % ≤ O ≤ 0.025 wt % |
| 0 wt % ≤ S ≤ 0.015 wt % | the rest iron, where Cr+Si+Al+Mn≤3.0 wt %, and up to 0.2 wt % of other impurities, where in further embodiments 10 wt %≤Co≤20 wt %, preferably 15 wt %≤Co≤20 wt %, or 0.5 wt %≤V≤4.0 wt %, preferably 1.0 wt %≤V≤3.0 wt %, preferably 1.3 wt %≤V≤2.7 wt %, or 0.1 wt %≤Cr≤2.0 wt %, preferably 0.2 wt %≤Cr≤1.0 wt %, preferably 0.3 wt %≤Cr≤0.7 wt %, or 0.1 wt %≤Si≤2.0 wt %, preferably 0.15 wt %≤Si≤1.0 wt %, preferably 0.2 wt %≤Si≤0.5 wt % and/or the sum formula being 0.1 wt %≤Cr+Si+Al+Mn≤1.5 wt %, preferably 0.2 wt %≤Cr+Si+Al+Mn≤0.6 wt %.

An electric machine having a rotor and a stator or having a carriage and a stator is also provided for, the stator having a laminated core according to any one of the preceding embodiments.

The electric machine can be used as a motor and/or as a generator.

The use of the electric machine according to any one of the preceding embodiments as a drive for an electric or hybrid-electric aircraft, as a main or auxiliary drive for a motor vehicle or as a generator for the generation of electricity for an aircraft is also provided for.

A transformer having a laminated core according to any one of the preceding embodiments is also provided for.

The invention also provides a method for producing a laminated core in which a plurality of lamination sheets is partially or completely separated from a strip made of a soft magnetic alloy by laser sublimation cutting, the lamination sheets each having a main surface and a thickness d. The main surface of a first of the lamination sheets is stacked on the main surface of a second of the lamination sheets in a direction of stacking and the main surfaces of the first and second lamination sheets are joined substance-to-substance at a plurality of points by laser welding, a plurality of filler-free joints being formed between the first and the second lamination sheets and being entirely surrounded by the main surface of the first and second lamination sheets.

A laser-based method is thus used both to separate the lamination sheets from the strip and to join the stacked lamination sheets to one another.

For the laser sublimation cutting it is possible to direct a first pulsed laser beam from a first laser source over the strip using a first guide means and a first focusing means in order to separate the plurality of lamination sheets from a strip by laser sublimation cutting. The first pulsed laser beam may have picosecond pulses or femtosecond pulses in order to ensure that the material of the strip is evaporated or sublimated along the cutting line. This prevents the material from melting and so forms burr-free edges on the lamination sheets. These burr-free edges permit the reliable stacking of the lamination sheet and the formation of a small gap between adjacent lamination sheets in the stack so as to increase the fill factor. Furthermore, fewer stresses occur along the cutting line due to the sublimation of the material of the strip and it is easier to avoid the resulting impairment of the magnetic properties of the material.

In other embodiments the first pulsed laser beam may have nanosecond pulses or microsecond pulses. With longer pulses it is possible that only some of the material of the strip will melt such that the edges are not entirely free from burrs. However, the other advantages of the method and the laminated cores produced using it continue to apply.

For the laser welding it is also possible to position a second laser beam from a second laser source on the main surface of the first lamination sheet in the stack using a second guide means and a second focusing means in order to form the joint by laser welding. The second laser beam may be a continuous beam.

The first and second guide means and focusing means each have optics. Due to the different laser beams used, i.e. a pulsed laser beam and a continuous laser beam, different guide und focusing means are suitable.

In both cases the optics may have one or more movable mirrors, the mirror or mirrors being controlled in order to direct the laser beam. The optics may also have one or more lenses in order to focus the laser beam.

In one embodiment the first laser beam is directed laterally and/or vertically over the strip in order to evaporate the material along the desired contour of the lamination sheet and to separate the lamination sheet from the strip. In one embodiment the second laser beam is directed laterally and/or vertically over the strip in order to position the joint on the main surface of the first lamination sheet and to melt the material of the lamination sheet at this position in order to produce the joint.

The first and the second laser sources may be used independently of the structure of the production line on the same or two separate manufacturing stations.

In some embodiments the lamination sheets are partially separated from the strip by laser sublimation cutting. For example, the lamination sheet may still be mechanically joined to the strip by one or more microwebs after the laser sublimation cutting step. In some embodiments the lamination sheets are joined to one another substance-to-substance by laser welding, while at least the top-most lamination sheet is joined mechanically to the strip. Only then are the microweb or microwebs severed. The webs may be severed by laser sublimation cutting or by another method such as shear cutting.

In some embodiments the first and the second lamination sheets are aligned and tensioned one on top of another with no lateral offset. The first and the second lamination sheets may, for example, be aligned by way of mechanical stops and/or templates that engage in a form fit with the lamination sheets.

In some embodiments the first lamination sheet is clamped against the second lamination sheet in the stack by way of a guide, this guide having openings through which the laser beam can be positioned for laser welding.

In some embodiments the strip is provided in the form of a coil and the strip is wound off the coil and advanced step-by-step. The strip may have locator holes with which the strip and/or the lamination sheets are positioned. For example, the strip and/or the lamination sheets may be positioned at least one locator pin that engages in the locator holes in order to position the strip or the lamination sheets.

In some embodiments the locator or pilot holes in the strip are produced by laser sublimation cutting, preferably in the same work step as the partial separation of the lamination sheets from the strip. In this way the position of the locator holes can be determined reliably in relation to the contours of the lamination sheets.

In some embodiments the strip is provided in the form of a band. A lamination sheet is separated from the band by laser sublimation cutting, the band or a further band is then arranged on the lamination sheet and the band or further band is clamped and joined to it by laser welding at at least one position. Only then is a second lamination sheet separated from the band.

In some embodiments the strip and the lamination sheets have an insulating layer. The lamination sheets with the insulating layer are separated from a strip by laser sublimation cutting and joined substance-to-substance at a plurality of points by laser welding. The insulating layer may comprise MgO or $ZrO_2$. The insulating layer is thus separated by laser sublimation cutting. During the laser welding, the laser beam is therefore directed at the insulating layer and typically evaporated during production of the weld point or weld seam.

In some embodiments the lamination sheets are separated from a strip that has a direction of rolling. The lamination sheets therefore have a direction that is parallel to the direction of rolling of the strip. The lamination sheets are stacked such that the direction of the lamination sheets varies about the direction of stacking. This arrangement can have the advantage of making it possible to compensate for differences between the lamination sheets, e.g. a variation in thickness and/or direction-dependent magnetic properties in the laminated core, thereby giving the laminated core more spatially homogeneous properties.

In some embodiments the thickness d of the lamination sheets varies. In some embodiments the lamination sheets can be stacked so that the direction of the lamination sheets varies about the direction of stacking and it is therefore possible to partially compensate for variations in thickness.

In some embodiments any scrap that occurs is also removed by compressed air, for example, after laser sublimation cutting.

The strip may be amorphous or nanocrystalline or crystalline or as-rolled or final annealed. The method is thus suitable for brittle strips such as finally annealed strips and annealed nanocrystalline strips and for ductile strips such as amorphous strips.

In some embodiments the laminated core is subsequently annealed following stacking and substance-to-substance joining. This annealing can be used to adjust the magnetic properties of the laminated core.

The method can be used for strips and lamination sheets made of different soft magnetic alloys. For example, the soft magnetic alloy may comprise:

an FeSi-based alloy with 2 to 4.5 wt % of at least one element from the group comprising Si and Al, the rest Fe and unavoidable impurities, or a CoFe-based alloy comprising 35 to 55 wt % Co and up to 2.5 wt % V, the rest Fe and unavoidable impurities, or a CoFe-based alloy comprising 45 wt %≤Co≤52 wt %, 45 wt %≤Fe≤52 wt %, 0.5 wt %≤V≤2.5 wt %, the rest Fe and unavoidable impurities, or a CoFe-based alloy comprising 35 wt %≤Co≤55 wt %, preferably 45 wt %≤Co≤52 wt %, 0 wt %≤Ni≤0.5 wt %, 0.5 wt %≤V≤2.5 wt %, the rest Fe and unavoidable impurities, or a CoFe-based alloy comprising 35 wt %≤Co≤55 wt %, 0 wt %≤V≤2.5 wt %, 0 wt %≤(Ta+2Nb)≤1 wt %, 0 wt %≤Zr≤1.5 wt %, 0 wt %≤Ni≤5 wt %, 0 wt %≤C≤0.5 wt %, 0 wt %≤Cr≤1 wt %, 0 wt %≤Mn≤1 wt %, 0 wt %≤Si≤1 wt %, 0 wt %≤Al≤1 wt %, 0 wt %≤B≤0.01 wt %, the rest Fe and unavoidable impurities, or a CoFe-based alloy comprising 5 to 25 wt % Co, 0.3 to 5.0 wt % V, the rest Fe and unavoidable impurities, or a CoFe-based alloy comprising substantially:

| | | | |
|---|---|---|---|
| 5 wt % | ≤ Co ≤ | 25 wt % |
| 0.3 wt % | ≤ V ≤ | 5.0 wt % |
| 0 wt % | ≤ Cr ≤ | 3.0 wt % |
| 0 wt % | ≤ Si ≤ | 3.0 wt % |
| 0 wt % | ≤ Mn ≤ | 3.0 wt % |
| 0 wt % | ≤ Al ≤ | 3.0 wt % |
| 0 wt % | ≤ Ta ≤ | 0.5 wt % |
| 0 wt % | ≤ Ni ≤ | 0.5 wt % |
| 0 wt % | ≤ Mo ≤ | 0.5 wt % |
| 0 wt % | ≤ Cu ≤ | 0.2 wt % |
| 0 wt % | ≤ Nb ≤ | 0.25 wt % |
| 0 wt % | ≤ Ti ≤ | 0.05 wt % |
| 0 wt % | ≤ Ce ≤ | 0.05 wt % |
| 0 wt % | ≤ Ca ≤ | 0.05 wt % |
| 0 wt % | ≤ Mg ≤ | 0.05 wt % |
| 0 wt % | ≤ C ≤ | 0.02 wt % |
| 0 wt % | ≤ Zr ≤ | 0.1 wt % |
| 0 wt % | ≤ O ≤ | 0.025 wt % |
| 0 wt % | ≤ S ≤ | 0.015 wt % | the rest iron, where Cr+Si+Al+Mn≤3.0 wt %, and up to 0.2 wt % of other impurities, where in further embodiments 10 wt %≤Co≤20 wt %, preferably 15 wt %≤Co≤20 wt %, or 0.5 wt %≤V≤4.0 wt %, preferably 1.0 wt %≤V≤3.0 wt %, preferably 1.3 wt %≤V≤2.7 wt %, or 0.1 wt %≤Cr≤2.0 wt %, preferably 0.2 wt %≤Cr≤1.0 wt %, preferably 0.3 wt %≤Cr≤0.7 wt %, or 0.1 wt %≤Si≤2.0 wt %, preferably 0.15 wt %≤Si≤1.0 wt %, preferably 0.2 wt %≤Si≤0.5 wt % and/or the sum formula being 0.1 wt %≤Cr+Si+Al+Mn≤1.5 wt %, preferably 0.2 wt %≤Cr+Si+Al+Mn≤0.6 wt %.

In some embodiments the thickness d of the lamination sheets is d≤0.5 mm, preferably d≤0.35 mm, d≤0.20 mm.

In some embodiments the laser beam is directed at the main surface of the first lamination sheet so as to form a punctiform joint or an elongated joint with a longitudinal direction or any predetermined path.

The elongated joint may have different lateral forms such as a straight line, a curve, a corner-shaped form or be X-shaped, V-shaped or U-shaped or have a closed form or an annular form.

In some embodiments the longitudinal direction is arranged parallel to the lines of the magnetic flux in the finished laminated core. As a result, the joints exercise less negative influence on the magnetic properties of the finished laminated core. The longitudinal direction may, for example, be arranged parallel to the lines of the magnetic flux in this plane of the finished laminated core.

In some embodiments the power of the laser beam is adjusted such that the joints have a depth and the depth of at least one of the joints extends over at least two or at least three adjacent stacked lamination sheets. In this way it is possible to join the desired number of adjacent lamination sheets to one another with the same joints.

In some embodiments the power of the laser beam is adjusted such that the joint in the bottom-most lamination sheet of the laminated core extends over only part of the total thickness of the sheet such that the lower end face of the laminated core is free from joints.

In some embodiments the first lamination sheet and the second lamination sheet are aligned in relation to one another so as to form a lap joint or a parallel joint. In this way the main surfaces of the lamination sheet can be joined to one another substance-to-substance by laser welding. In this way the joints between the first and second lamination sheets can be produced by positioning the joint or the laser beam on the main surface of the top-most lamination sheet.

In some embodiments the first lamination sheet and the second lamination sheet are tensioned to reduce the air gap between the first lamination sheet and the second lamination sheet. This embodiment can be used to increase the fill factor.

The first lamination sheet is joined substance-to-substance to the second lamination sheet by laser welding or laser spot welding to form a joint. In some embodiments a laser beam is directed laterally to position the joint on the first lamination sheet. A focal point of the laser beam can be directed vertically to determine the vertical course of the joint. In some embodiments the laser beam is directed at the main surface of the first lamination sheet so as to form a punctiform joint. In some embodiments the laser beam is directed over the main surface of the first lamination sheet so as to form an elongated joint with a longitudinal direction. The elongated joint may, for example, be a straight line, a curve or be X-shaped, U-shaped, V-shaped or have a zig-zag shaped form.

The longitudinal direction may be arranged parallel to the lines of the magnetic flux in the finished laminated core in order to reduce eddy currents and the associated losses. In some embodiments the longitudinal direction is arranged parallel to the lines of the magnetic flux in this plane of the finished laminated core.

In some embodiments at least three lamination sheets are stacked one on top of another and joined to one another by a plurality of joints. With this method it is possible to reduce the number of joints and increase productivity.

In some embodiments the method according to any one of the preceding embodiments also comprises the stacking of at least one further lamination sheet on the second lamination sheet, followed by the substance-to-substance joining of the further lamination sheet and the first lamination sheet by a plurality of filler-free joints that are entirely surrounded by the main surfaces of the further and the first lamination sheets.

BRIEF DESCRIPTION OF THE DRAWINGS

Embodiments und examples are described in greater detail below with reference to the drawings.

FIG. 4 shows a schematic illustration of strips with locator holes with which the strip is positioned by locator pins.

DETAILED DESCRIPTION OF EXAMPLE EMBODIMENTS

Figure 1:
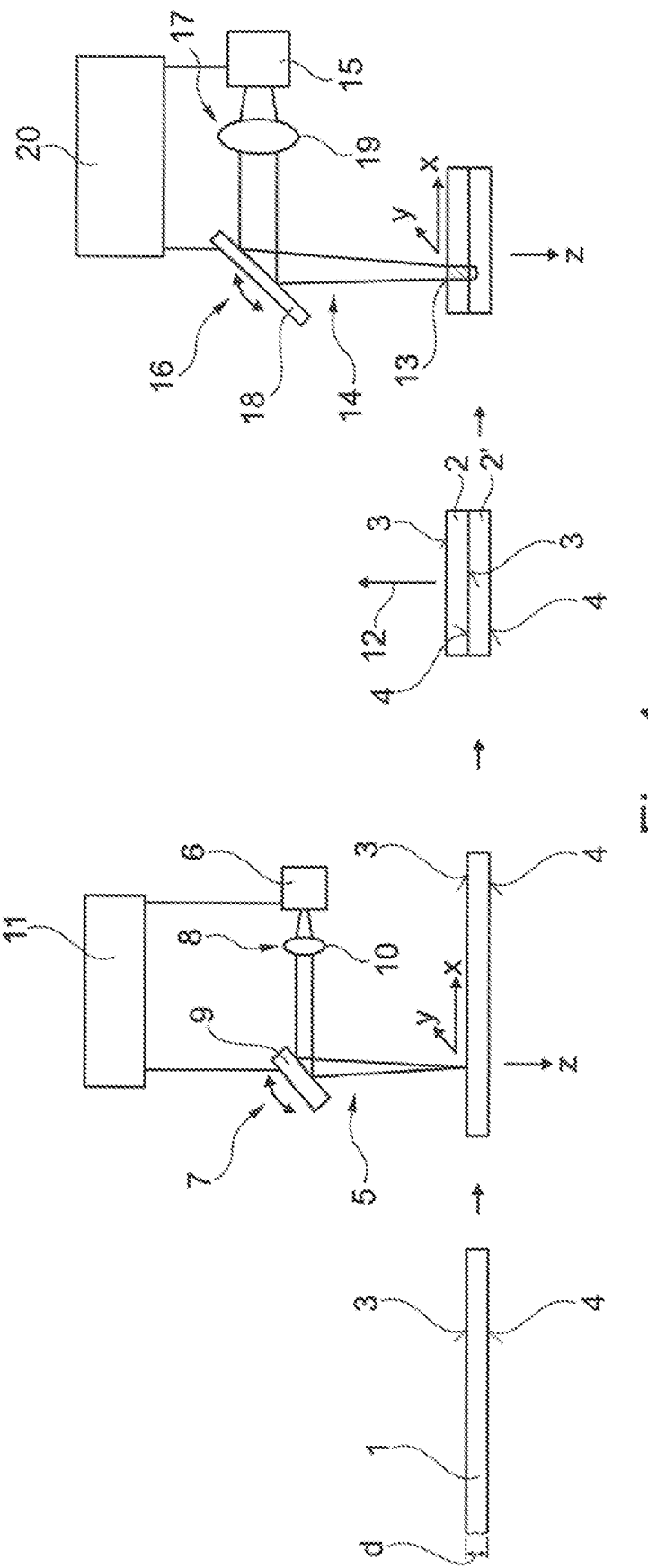
FIG. 1 shows a schematic illustration of a method for producing a laminated core.

FIG. 1 shows a schematic illustration of a method for producing a laminated core. A metallic strip 1 made of a soft magnetic alloy is provided. The metallic strip 1 may be amorphous or nanocrystalline and may be in an as-rolled or annealed state. For example, the metallic strip 1 may be made of a CoFe-based alloy. The metallic strip has a first main surface 3, a second, opposing main surface 4 and a thickness d. The thickness d may be approximately 0.1 mm. The metallic strip 1 may be provided in the form of a wound coil or a band.

A plurality of lamination sheets 2, 2' is partially or completely separated from the strip 1 by laser sublimation cutting. For the laser sublimation cutting a first pulsed laser beam from a first laser source 6 is directed by a first guide means 7 and a first focusing means 8 over the strip 1, typically laterally in an X-direction and a Y-direction and vertically in a Z-direction, to separate the plurality of lamination sheets 2 from a strip 1. The first pulsed laser beam may have picosecond pulses or femtosecond pulses in order to ensure that the material of the strip 1 is evaporated or sublimated along the cutting line. This prevents the material from melting and so forms burr-free edges on the lamination sheets 2. The separated lamination sheets 2, 2' have a first main surface 3, a second, opposing main surface 4 and a thickness d. The lamination sheets 2, 2' are then stacked one on top of another to produce a laminated core. The burr-free edges allow the lamination sheets 2, 2' to be reliably handled automatically and a small gap to be formed between adjacent lamination sheets 2 in the stack to increase the fill factor of the laminated core.

The first guide means 7 has optics comprising one or more movable mirrors 9. The mirror or mirrors 9 are controlled using a control unit 11 to direct and/or focus the laser beam 5. The first focusing means also has optics that may have a lens 10 for focusing the laser beam 5. The laser source 6 can also be controlled using the control unit 11 in order to set the power and pulse duration of the laser beam, for example.

Once the lamination sheets 2 have been separated from the strip by laser sublimation cutting, the main surface 4 of a first of the lamination sheets 2 is stacked on the main surface 3 of a second of the lamination sheets 2' in a direction of stacking 12. The main surfaces 4, 3 of the first and the second lamination sheets 2, 2' are then substance-to-substance joined at a plurality of points 13 by laser welding, a plurality of filler-free joints 13 being formed between the first and the second lamination sheet 2, 2' and being entirely surrounded by the main surfaces 4, 3 of the first and the second lamination sheets 2, 2'. In this way a laser-based method is used to separate the lamination sheets 2, 2' from the strip 1 and to join the stacked lamination sheets 2, 2' to one another.

For the laser welding a second laser beam 14 from a second laser source 15 is positioned by a second guide means 16 and a second focusing means 16 on the main surface 3 of the top-most lamination sheet 2 in the stack in order to form the joint 13 by laser welding. The second laser beam 14 may be a continuous laser beam or a pulsed laser beam, the pulse duration typically being greater than for the laser sublimation cutting.

The second guide means and focusing means 16, 17 have optics comprising one or more movable mirrors 18 or lenses 19. The mirror or mirrors 18 are controlled using a control unit 20 to direct and/or focus the laser beam 14 in order to form the plurality of discrete joints 13.

Depending on the structure of the production line, the first and second laser sources 6, may be used at the same or at two separate manufacturing stations.

In some embodiments the lamination sheets 2, 2' are partially separated from the strip 1 by laser sublimation cutting. For example, the lamination sheet 2, 2' is first joined mechanically to the strip 1 by one or more microwebs. This method can facilitate the handling of the lamination sheets 2, 2' during the following process steps including the stacking of the lamination sheets 2, 2'. In some embodiments the lamination sheets 2, 2' are joined substance-to-substance to one another by laser welding, while at least the top-most lamination is joined to the strip.

In some embodiments the first and second lamination sheets 2, 2' are aligned and tensioned with no lateral offset in relation to one another. The first and second lamination sheets 2, 2' may be aligned by mechanical stops and/or templates, for example, that engage in a form fit with the lamination sheets. In some embodiments the first lamination sheet 2 is clamped against the second lamination sheet in the stack by a guide, this guide having openings through which the laser beam 14 can be positioned for laser welding.

In some embodiments the strip 1 is provided in the form of a band. A lamination sheet 2 is separated from the band by laser sublimation cutting, the band or a further band is arranged on the top-most lamination sheet in the stack and then the band or the further band is clamped and joined to it by laser welding at at least one position in order to produce a joint 13. Only then is a second lamination sheet 2' separated from the band.

In some embodiments the strip 1 is provided in the form of a coil and the strip 1 is wound off the coil and advanced step-by-step. The strip 1 may have locator holes with which the strip is positioned, as illustrated schematically and explained in greater detail in conjunction with FIG. 4.

In some embodiments the strip 1 and so the lamination sheets 2 have an insulating layer. The lamination sheets 2 are separated with the insulating layer from a strip 1 by laser sublimation cutting and joined substance-to-substance at a plurality of points 13 by laser welding. The insulating layer may be made of MgO or ZrO₂. In this way the insulating layer is separated by the laser beam 5 by laser sublimation cutting. For the laser welding, the second laser beam 14 is directed at the insulating layer on the top-most main surface, which is typically evaporated during the production of the weld spot or weld seam.

Figures 2A, 2B:
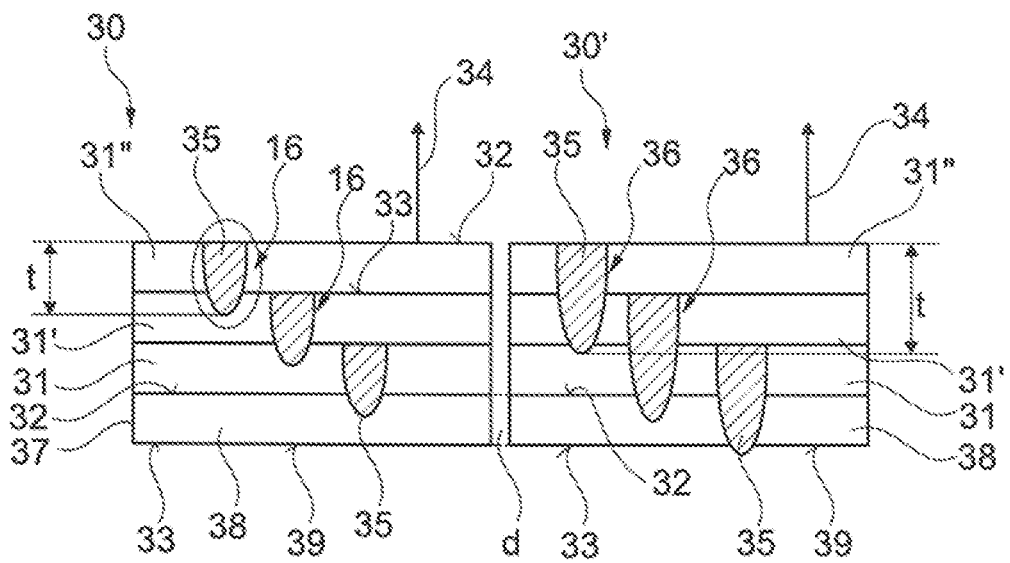
FIG. 2a shows a schematic illustration of a cross section of a laminated core with joints according to a first embodiment.
FIG. 2b shows a schematic illustration of a cross section of a laminated core with joints according to a first embodiment.

FIG. 2a shows a schematic illustration of a cross section of a laminated core 30 that can be produced using the method illustrated in FIG. 1.

The laminated core 30 has a plurality of lamination sheets 31 made of a soft magnetic alloy that have been separated by laser sublimation from a strip made of the soft magnetic alloy. For example, the soft magnetic alloy may be a CoFe alloy, e.g. 49 wt % Fe, 49 wt % Co and 2 wt % V+Nb. The lamination sheets 31 each have a main surface 32, an opposing main surface 33 and a thickness d. The thickness d may be approximately 0.2 mm. The lamination sheets 31 are stacked one on on top of another in a direction of stacking 34, the direction of stacking 34 extending perpendicular to the main surfaces 32, 33 of the lamination sheets 31. Adjacent lamination sheets, e.g. lamination sheets 31' and 31" in FIG. 2a, are joined to one another by at least one, preferably a plurality of, substance-to-substance joints 35. The joints 35 are filler-free and are each entirely surrounded by the main surface 12 of the lamination sheets 31', 31". The plurality of substance-to-substance joints 35 is distributed over the main surface 32 of the lamination sheets 31. The joints 35 may, for example, be formed by laser welding such that the joints 35 are formed of molten material of the soft magnetic alloy that has been resolidified.

The laminated core 30 may have numerous stacked lamination sheets 31, for example 100 to 500. The joints 35 have a depth t such that they are arranged in two, as illustrated in the first embodiment shown in FIG. 2a, or more than two, for example three, as illustrated in the second embodiment in FIG. 2b, lamination sheets 31 and these lamination sheets are joined at a number of points. In cross section, the laminated core has a plurality of joints 35 that are arranged in different planes 36 of the laminated core 30 such that the lamination sheets 31 are built up by the joints 35 to form a laminated core. The joints 35 are thus distributed throughout the volume of the laminated core 30.

Outside of the joints 35, adjacent lamination sheets 31 may be separated from one another and/or electrically insulated from one another. The lamination sheets 31 may have an insulating layer that covers at least the main surfaces 32, 33. This insulating layer may, for example, be made of MgO or ZrO₂. The lamination sheets 31 may be coated with the insulating layer individually. In some embodiments, however, the strip is coated with the insulating layer and the lamination sheets 31 are then separated from the strip with the insulating layer on the opposing main surfaces 32, 33. It is possible to coat only one of the main surfaces with the insulating layer and to arrange the insulating layer between adjacent lamination sheets 31 in the stack. In some embodiments the insulating layer is applied to both main surfaces 32, 33 using a dipping process, for example.

In the first embodiment illustrated in FIG. 2a the depth t of the joint is less than 2d, i.e. twice the thickness. As a result, the joint 35 does not extend as far as the lower main surface 33 of the lower lamination sheet 31. This arrangement may be used for all or only some of the joints 35, for example for the bottom-most joints, such that the underside 39 of the laminated core 30 formed by the lower main surface 33 of the bottom-most lamination sheet 38 has no joints and so has a continuous uninterrupted structure.

In the second embodiment illustrated in FIG. 2b the depth t of the joint is greater than 2d such that the joint 35 is arranged in three adjacent lamination sheets 31, 31' and 31". In this embodiment the bottom-most joint 35 extends as far as the underside 39 of the laminated core 30.

In some embodiments, as in the first and second embodiments shown in FIGS. 1a and 1b, the joints 35 are offset laterally in relation to one another in two adjacent planes 36 of the laminated core 30. It is, however, also possible for a plurality of joints 35 to be arranged vertically one on top of another. Depending on the depth of the joints, the vertically aligned joints may overlap vertically or abut one another vertically so as to form a column of re-solidified molten material of the soft magnetic alloy.

The laminated cores 30, 30' have joints 35 which, rather than running along the outer or inner contour of the stack 30, 30', are arranged on the main surfaces 32, 33 of the individual laminations 31 and between the individual layers of the stack 30, 30'. In contrast to laminated cores in which a plurality of stacked lamination sheets 31 are joined to one another by a weld seam at one end face 37 of the laminated core 30, here the joints 35 are entirely laterally surrounded by the adjacent lamination sheets 31 in which the joint 35 is arranged such that the joint 35 is entirely and uninterruptedly surrounded laterally by the crystalline, amorphous or nanocrystalline material of the lamination sheets 31. With the joints 35 in the laminated core 30, 30' according to the invention, however, at least the side walls of the joints 35 entirely and uninterruptedly abut the material of the lamination sheets 31. In contrast, when there is a seam on the end face 37 of the laminated core 30 at least part of the seam abuts the air.

Figure 2C:
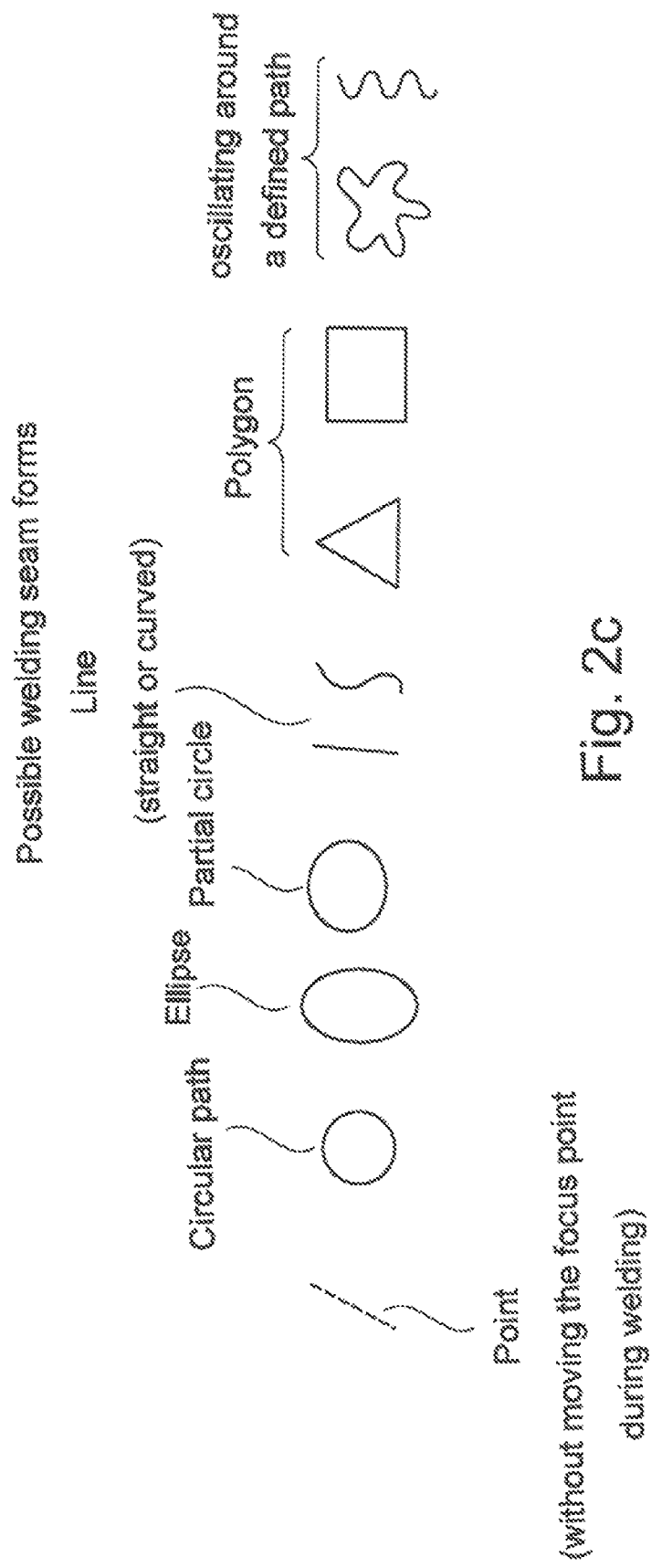
FIG. 2c shows a schematic illustration of various lateral forms of joints for a laminated core.

In the top view the joints 35 can have different lateral forms. It is also possible to use joints of different lateral form and/or different depth in the same laminated core. FIG. 2c shows a schematic illustration of different lateral forms that can be used for the joints 35. For example, the joints may be a circle, an ellipse, part of a circle, a straight or curved line, a polygon or oscillate about a given path in the form of a ring or a straight line.

Figure 3:
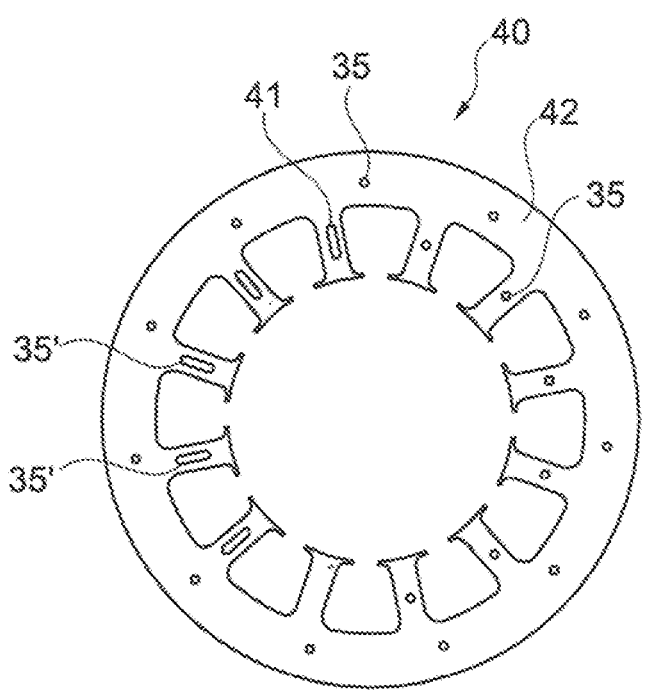
FIG. 3 shows a top view of the end face of a laminated core indicating joints.

FIG. 3 shows a top view of the end face of a laminated core 30 that has the form of a stators 40. The stator 40 has a plurality of teeth 41 that are evenly distributed around an outer ring 42 such that the teeth 41 point towards the centre point or centre axis 43 of the stator 40. FIG. 3 shows examples of joints 35 in schematic form. The joints 35 may be punctiform and be arranged both in the central region of the ring 42 and in the central region of the teeth 41. In other embodiments the joints 35' have an elongated form such as a line, which can be straight as illustrated in FIG. 3, for example. An elongated joint 35 may also have other forms, e.g. a curved shape or the shape of a circular ring, or be X-shaped, V-shaped, etc. Other joints 35 not shown in the top view are arranged between lamination sheets located in the stack of the laminated core 30 such that the joint 35 is arranged in a plurality of planes and is distributed throughout the volume of the laminated core 30 in order to join all the lamination sheets substance-to-substance at a number of points to form a laminated core 30.

The joints 35 are laterally small and distributed over the main surfaces 32, 33 such that they can be produced with a low-energy laser beam, thereby reducing the risk of damaging the lamination sheet 31 by erroneously making a hole in the lamination sheet, for example. Consequently, the sheet thickness of the individual layers of the laminated cores 30 can be very low, typically in the region of 0.1 mm or even lower.

As a result of the laser welding process the laminated cores may have very small joints. In the case of spot welding, weld spot diameters in the region of 10 µm to 1000 µm, 10 µm to 500 µm or 20 µm to 60 µm can be achieved. In the case of linear seams, the joints may have seams of the same width, i.e. a width of 10 µm to 1000 µm, 10 µm to 500 µm or 20 µm to 60 µm, and a length L, where L>B. The electrical contact surface between the layers can be reduced to a maximum of 10% or 5% or 1% of the boundary surface, for example. This increases the electrical resistance between the individual layers and so reduces eddy current losses.

The laminated cores 30, 30' may also have joints 35 between the lamination sheets 31 that can vary in form, size, number and position on the cross section from lamination sheet to lamination sheet. Moreover, the form, size, number and position of the lamination sheets 31 can be adapted to the locally occurring magnetic flux density within the layers during operation of the laminated core 30. The joints 35 can be designed so as to reduce any negative influences on the magnetic properties of the layers.

FIG. 4 shows cross sections and a top view of a strip 1 with at least one locator hole 21 with which the strip 1 is positioned and/or the lamination sheets 2 are positioned. The locator hole 21 may be formed in the strip 1 by punching using a punching tool 23. The strip 1 and/or the lamination sheets 2, 2' can be moved by at least one locator pin 22 that engages in the locator hole or holes 20 in order to position the strip 1 or the lamination sheets 2. In some embodiments the locator holes 17 are used to position the strip in a plurality of manufacturing steps. For example, the cutting contours 24, 24' for the lamination sheets 2, 2' can be produced one after another, as illustrated schematically in FIG. 4, the locator holes 21 being used to align the cutting contours 24' formed in the second step more accurately that the cutting contours 24 formed in the first step.

The method for producing a laminated core can be automated in different manners.

In one embodiment individual laminations are completely separated from a sheet by laser sublimation, stacked one on top of another manually layer by layer and joined to the stack by a plurality of welded spots distributed over the main surface. A manual method of this type can be used for the production for samples, for example.

A pulsed laser source is used for the laser sublimation method. A solid-state fibre laser, for example, may be used for the laser welding. With this method a scanner optics with a plan field lens permits the rapid and accurate positioning of the focal point in the work chamber of the laser system by directing the laser beam by mirrors, thereby making it possible to produce all the joints on one layer in one tensioning operation. Furthermore, the programmable optics can, where necessary, be used to adapt the focal position to the current stack height. Depending on the design of the joint, continuous-wave or pulsed-wave laser welding can be used. This manual embodiment of the method is particularly suitable for the production of samples and prototypes in small quantities.

In one embodiment each layer is aligned by an appropriate device and clamped to the existing stack before the laser spot welding is carried out.

The purpose of this alignment is to ensure the complete overlapping of the layers with no lateral offset and no undesirable relative rotation about the longitudinal axis of the stack. Mechanical stops and template elements that engage in a form fit with geometrical elements of the individual layers, for example, can be used to perform this alignment. External and internal diameters, tooth flanks and locating elements fitted by the stack manufacturer, for example, are suitable for positioning the finished stacks on the motor/generator shaft or in a housing.

The purpose of clamping the layers is to ensure a minimum air gap between them after welding. This clamping can be carried out using a guide, for example, that presses an individual lamination flat against the top-most lamination of the already joined stack and contains local openings to permit welding. Here either the guide may be pressed against the stack or the stack pressed against the guide. The option of a fixed guide offers the advantage of providing a fixed focal point location for the laser welding operation.

In a second embodiment individual method steps such as the stacking, positioning and clamping of the laminations are automated such that the entire method is partially automated. To this end, ready cut laminations are fed in a magazine or connected by microwebs in a metal strip, for example, to the automatic system, which then transfers them by way of a grabber/suction cup, slider or turntable for welding in the work chamber of the laser system, where they are automatically clamped and joined substance-to-substance at a plurality of points to the lamination sheet or sheets below. Once the desired stack height is reached, the partially automated process comes to an end and the finished stack can be removed. The stack height can be determined by an integrated height measurement device or by a layer-counting function in the automated system.

In a third embodiment the method is further automated. In the third embodiment a sheet metal strip or a series of metal plates (both referred to below as "bands") are fed to a system. This can be done by way of a decoiler, guide rollers and a feeder device, as used in punching technology. With small sheet thicknesses there is no need for straightening to remove any coil set that may be present. The contour of a first lamination is cut from the band by laser sublimation. Here the separated lamination may remain joined substance-to-substance with the band by microwebs.

Loose scrap can be blown out of the band by compressed air and removed from the system by scrap chutes, for example. The first lamination is placed in a positioning device by a feed cycle. Here the microwebs are either severed perpendicular to the infeed by remote laser cutting or by a further tool movement and the lamination thus removed from the band. The next feed cycle positions a second lamination above the first in the same manner.

In a manner similar to the second partially automated embodiment, the two laminations are now automatically clamped together by a guide and then joined by repeated laser welding. In a further feed cycle the scrap remaining in the band (the "scrap lattice") is transported out of the work chamber and the next lamination is positioned above the stack already joined. The stack grows layer by layer as the process is repeated, the already joined laminations being removed as a growing stack in a second cycle direction perpendicular to the band. The second cycle direction may, for example, take the form of a vertical movement of the lamination positioning device. Alternatively, the focal position can be adjusted by moving the laser vertically.

If the individual operations are separated as in this third embodiment, pilot holes can be cut at the first station and then used at subsequent stations in conjunction with pin stops to position the band (ventilated infeed). This ensures the exact positioning of the cutting and welding operations carried out at the individual stations in relation to one another.

In all the preferred embodiments described below the term "joint" is always used to refer to a joint produced by laser welding in the form of a lap joint according to the third embodiment.

In a third embodiment of a laminated core the laminated core has a plurality of punctiform joints with a diameter of not more than 20-200 µm that are distributed over the contact surface of at least two layers to be joined, i.e. over the main surfaces of adjacent lamination sheets. This type of distribution, which ensures a joint between layers that is sufficiently strong for the further processing and subsequent use of the stack and at the same time has no more than a minimal adverse effect on the desired electromagnetic properties of the stack, is advantageous. Laminated cores according to the invention have a large number and fine distribution of joints. As a consequence, external loads in individual joints cause comparatively low stresses since the mechanical stresses are distributed over a plurality of joints and the lever arms between the load application points and the joints are shortened. Such external loads are created by punctiform and linear contact surfaces and relative movements when joining the stacks to shafts and housings, for example.

According to the invention a connection point can be located at any point on the lamination without requiring any change to the design of the system. In this way it is possible to effectively prevent local or complete delamination and the splitting of the laminations in the region of delicate structures (such as teeth), for example. Despite their plurality, the small size of the connection points produces a comparatively small electrical contact surface between the layers, which minimises eddy current losses. The small connection point size also simplifies this method of positioning the connection points, which impairs the magnetic flux as little as possible.

In a fourth embodiment other forms of joints, which can be freely selected by setting the path of the laser dot, are used alongside punctiform joints. The forms may, for example, be straight lines, circles, polygons or other curved lines. Linear seam courses that run parallel to the lines of the magnetic flux are advantageous. The magnetic flux is then only impaired by the width of the seam, so reducing the cross section without imperfections available for the flux. Where a seam runs parallel to the flux, its length has no influence on flux impairment and can be optimised with regard to joint strength and electrical contact surface. This shifts the comprise between electrical contact, magnetic influence and joint strength towards higher joint strengths.

In a fifth embodiment the position of the joints is varied from layer to layer in order to lengthen the eddy current paths created by the electrical contact. Here the laser is set such that as few layers as possible (ideally only two) are joined at each joint. Here the bottom-most layer should not be fused over the entire thickness. This arrangement can be used in the third and fourth embodiments, i.e. with punctiform and elongated joints.

The invention claimed is:

1. A method for producing a laminated core, comprising:
   completely separating a plurality of lamination sheets from a strip made of a soft magnetic alloy by laser sublimation cutting, the lamination sheets each having a first main surface and a second main surface opposing the first main surface and each having a thickness d,
   stacking the second main surface of a first of the lamination sheets on the first main surface of a second of the lamination sheets in a direction of stacking, wherein the direction of stacking extends perpendicular to the main surfaces of the lamination sheets,
   substance-to-substance joining of the second main surface of the first lamination sheet and the first main surface of the second lamination sheets by laser welding at a plurality of points, the laser welding forming a plurality of filler-free joints between the first and the second lamination sheets and being entirely surrounded by the second main surface of the first lamination sheet and the first main surface of the second lamination sheet,
   subsequently stacking the second main surface of a further lamination sheet on the first main surface of the first lamination sheet in the direction of stacking,
   substance-to-substance joining of the second main surface of the further lamination sheet and the first main surface of the first lamination sheet by laser welding at a plurality of points, the laser welding forming a plurality of filler-free joints between the further lamination sheet and the first lamination sheet that are entirely surrounded by the second main surface of the further lamination sheet and the first main surface of the first lamination sheet,
   wherein the soft magnetic alloy comprises:
   a FeSi-based alloy with 2 to 4.5 wt % of at least one element from the group comprising Si and Al, the rest Fe and unavoidable impurities, or
   a CoFe-based alloy comprising 35 to 55 wt % Co and up to 2.5 wt % V, the rest Fe and unavoidable impurities, or
   a CoFe-based alloy comprising 45 wt %≤Co≤52 wt %, 45 wt %≤Fe≤52 wt %, 0.5 wt %≤V≤2.5 wt %, the rest Fe and unavoidable impurities, or
   a CoFe-based alloy comprising 35 wt %≤Co≤55 wt %, 0 wt %≤Ni≤0.5 wt %, 0.5 wt %≤V≤2.5 wt %, the rest Fe and unavoidable impurities, or
   a CoFe-based alloy comprising 35 wt %≤Co≤55 wt %, 0 wt %≤V≤2.5 wt %, 0 wt %≤(Ta+2Nb)≤1 wt %, 0 wt %≤Zr≤1.5 wt %, 0 wt %≤Ni≤5 wt %, 0 wt %≤C≤0.5 wt %, 0 wt %≤Cr≤1 wt %, 0 wt %≤Mn≤1 wt %, 0 wt %≤Si≤1 wt %, 0 wt %≤Al≤1 wt %, 0 wt %≤B≤0.01 wt %, the rest Fe and unavoidable impurities, or
   a CoFe-based alloy comprising 5 to 25 wt % Co, 0.3 to 5.0 wt % V, the rest Fe and unavoidable impurities,
   wherein the strip and the first, second and further lamination sheets each comprise an insulating layer and the lamination sheets with the insulating layer are separated from the strip by laser sublimation, and
   wherein the insulating layer comprises MgO or $ZrO_2$.

2. A method according to claim 1, wherein for the laser sublimation cutting a first pulsed laser beam from a first laser source is directed over the strip by a first guide means and a first focusing means in order to separate the plurality of lamination sheets from a strip by laser sublimation cutting.

3. A method according to claim 2, wherein, for the laser welding, a second laser beam from a second laser source is positioned on the main surface of the first lamination sheet in the stack by a second guide means and a second focusing means in order to form the joint by laser welding.

4. A method according to claim 3, wherein the first and second guide means and focusing means each have optics, and the optics comprises one or more movable mirrors and the mirror or mirrors being controlled in order to direct and/or focus the laser beam.

5. A method according to claim 3, wherein the first laser beam is directed laterally and/or vertically over the strip in order to separate the lamination sheet from the strip, and/or wherein the second laser beam is directed laterally and/or vertically over the strip in order to position the joint on the main surface of the first lamination sheet.

6. A method according to claim 1, wherein the first and the second lamination sheets are aligned with and tensioned to one another with no lateral offset.

7. A method according to claim 1, wherein the first and the second lamination sheets are aligned by mechanical stops and/or templates that engage in a form fit with the lamination sheets.

8. A method according to claim 1, wherein the first lamination sheet is clamped against the second lamination sheet in the stack by a guide, this guide having openings through which the laser beam can be positioned for the laser welding.

9. A method according to claim 1, wherein the strip is provided in the form of a coil and the strip being wound off the coil and advanced step-by-step.

10. A method according to claim 1, wherein the strip comprises locator holes with which the strip and/or the lamination sheets are positioned, and wherein the strip and/or the lamination sheets are positioned by at least one locator pin that engages in the locator holes in order to position the strip and/or the lamination sheets.

11. A method according to claim 1, wherein the strip is provided in the form of a band, a lamination sheet is separated from the band by laser sublimation cutting, the band or a further band is arranged on the lamination sheet and then the band or the further band is clamped and joined to it in at least one position by laser welding, and only then a second lamination sheet is separated from the strip.

12. A method according to claim 1, wherein the strip is amorphous or nanocrystalline or crystalline or as-rolled or final annealed.

13. A method according to claim 1, wherein the laminated core is subsequently annealed.

14. A method according to claim 1, wherein the thickness d≤0.5 mm.

15. A method according to claim 1, wherein the laser beam is directed at the first main surface of the first lamination sheet so as to form a punctiform joint, or the laser beam is directed over the first main surface of the first lamination sheet so as to form an elongated joint with a longitudinal direction.

16. A method according to claim 1, wherein the power of the laser beam is adjusted such that the joints each have a depth and the depth of at least one of the joints extending over a maximum of two or a maximum of three or at least three adjacent stacked lamination sheets.

17. A method according to claim 1, wherein the first lamination sheet and the second lamination sheet are aligned in relation to one another so as to form a lap joint or a parallel joint.

18. A method according to claim 1, wherein at least three lamination sheets being stacked one on top of another and joined to one another by a plurality of joints.

19. A method for producing a laminated core, comprising:
completely separating a plurality of lamination sheets from a strip made of a soft magnetic alloy by laser sublimation cutting, the lamination sheets each having a first main surface and a second main surface opposing the first main surface and each having a thickness d,
stacking the second main surface of a first of the lamination sheets on the first main surface of a second of the lamination sheets in a direction of stacking, wherein the direction of stacking extends perpendicular to the main surfaces of the lamination sheets,
substance-to-substance joining of the second main surface of the first lamination sheet and the first main surface of the second lamination sheets by laser welding at a plurality of points, a plurality of filler-free joints being formed between the first and the second lamination sheets and being entirely surrounded by the second main surface of the first lamination sheet and the first main surface of the second lamination sheet,
subsequently stacking the second main surface of a further lamination sheet on the first main surface of the first lamination sheet in the direction of stacking,
substance-to-substance joining of the second main surface of the further lamination sheet and the first main surface of the first lamination sheet by laser welding at a plurality of points, the laser welding forming a plurality of filler-free joints between the further lamination sheet and the first lamination sheet that are entirely surrounded by the second main surface of the further lamination sheet and the first main surface of the first lamination sheet,
wherein the soft magnetic alloy is a crystalline CoFe-based alloy consisting essentially of

| |
|---|
| 5 wt % ≤ Co ≤ 25 wt % |
| 0.3 wt % ≤ V ≤ 5.0 wt % |
| 0 wt % ≤ Cr ≤ 3.0 wt % |
| 0 wt % ≤ Si ≤ 3.0 wt % |
| 0 wt % ≤ Mn ≤ 3.0 wt % |
| 0 wt % ≤ Al ≤ 3.0 wt % |
| 0 wt % ≤ Ta ≤ 0.5 wt % |
| 0 wt % ≤ Ni ≤ 0.5 wt % |
| 0 wt % ≤ Mo ≤ 0.5 wt % |
| 0 wt % ≤ Cu ≤ 0.2 wt % |
| 0 wt % ≤ Nb ≤ 0.25 wt % |
| 0 wt % ≤ Ti ≤ 0.05 wt % |
| 0 wt % ≤ Ce ≤ 0.05 wt % |
| 0 wt % ≤ Ca ≤ 0.05 wt % |
| 0 wt % ≤ Mg ≤ 0.05 wt % |
| 0 wt % ≤ C ≤ 0.02 wt % |
| 0 wt % ≤ Zr ≤ 0.1 wt % |
| 0 wt % ≤ O ≤ 0.025 wt % |
| 0 wt % ≤ S ≤ 0.015 wt % | the rest iron, where Cr+Si+Al+Mn≤3.0 wt %, and up to 0.2 wt % of other impurities,
wherein the strip and the first, second and further lamination sheets each comprise an insulating layer and the lamination sheets with the insulating layer are separated from the strip by laser sublimation, and
wherein the insulating layer comprises MgO or $ZrO_2$.

20. A method for producing a laminated core, comprising:
completely separating a plurality of lamination sheets from a strip made of a crystalline soft magnetic alloy by laser sublimation cutting, the lamination sheets each having a first main surface and a second main surface opposing the first main surface and each having a thickness d,
stacking the second main surface of a first of the lamination sheets on the first main surface of a second of the lamination sheets in a direction of stacking, wherein the direction of stacking extends perpendicular to the main surfaces of the lamination sheets, substance-to-substance joining of the second main surface of the first lamination sheet and the first main surface of the second lamination sheets by laser welding at a plurality of points, a plurality of filler-free joints being formed between the first and the second lamination sheets and being entirely surrounded by the second main surface of the first lamination sheet and the first main surface of the second lamination sheet, and subsequently stacking the second main surface of a further lamination sheet on the first main surface of the first lamination sheet in the direction of stacking, substance-to-substance joining of the second main surface of the further lamination sheet and the first main surface of the first lamination sheet by laser welding at a plurality of points, the laser welding forming a plurality of filler-free joints between the further lamination sheet and the first lamination sheet that are entirely surrounded by the second main surface of the further lamination sheet and the first main surface of the first lamination sheet, wherein the crystalline soft magnetic alloy comprises:

a CoFe-based alloy comprising 35 to 55 wt % Co and up to 2.5 wt % V, the rest Fe and unavoidable impurities, or a CoFe-based alloy comprising 45 wt %≤Co≤52 wt %, 45 wt %≤Fe≤52 wt %, 0.5 wt %≤V≤2.5 wt %, the rest Fe and unavoidable impurities, or a CoFe-based alloy comprising 35 wt %≤Co≤55 wt %, 0 wt %≤Ni≤0.5 wt %, 0.5 wt %≤V≤2.5 wt %, the rest Fe and unavoidable impurities, or a CoFe-based alloy comprising 35 wt %≤Co≤55 wt %, 0 wt %≤V≤2.5 wt %, 0 wt %≤(Ta+2Nb)≤1 wt %, 0 wt %≤Zr≤1.5 wt %, 0 wt %≤Ni≤5 wt %, 0 wt %≤C≤0.5 wt %, 0 wt %≤Cr≤1 wt %, 0 wt %≤Mn≤1 wt %, 0 wt %≤Si≤1 wt %, 0 wt %≤Al≤1 wt %, 0 wt %≤B≤0.01 wt %, the rest Fe and unavoidable impurities, or a CoFe-based alloy comprising 5 to 25 wt % Co, 0.3 to 5.0 wt % V, the rest Fe and unavoidable impurities, and wherein the strip and the first, second and further lamination sheets each comprise an insulating layer and the lamination sheets with the insulating layer are separated from the strip by laser sublimation.

\* \* \* \* \*